United States Patent
Koli et al.

(10) Patent No.: US 12,515,635 B2
(45) Date of Patent: Jan. 6, 2026

(54) CHARGE CURRENT BASED SHIFT METHOD AND SYSTEM

(71) Applicant: Dana Heavy Vehicle Systems Group, LLC, Maumee, OH (US)

(72) Inventors: Rohit Koli, Toledo, OH (US); Nathan Smith, Toledo, OH (US); Mohammed Yasin, Canton, MI (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 300 days.

(21) Appl. No.: 18/302,617

(22) Filed: Apr. 18, 2023

(65) Prior Publication Data

US 2024/0351568 A1    Oct. 24, 2024

(51) Int. Cl.
*B60W 10/08* (2006.01)
*B60W 10/26* (2006.01)

(52) U.S. Cl.
CPC ............ *B60W 10/08* (2013.01); *B60W 10/26* (2013.01); *B60W 2710/083* (2013.01)

(58) Field of Classification Search
None
See application file for complete search history.

(56) References Cited

U.S. PATENT DOCUMENTS

| 9,056,613 | B2 | 6/2015 | Johri et al. | |
| 9,533,677 | B2 | 1/2017 | Nefcy et al. | |
| 2015/0126329 | A1* | 5/2015 | Johri | B60K 6/387 |
| | | | | 903/902 |
| 2017/0008529 | A1* | 1/2017 | Kim | B60W 20/14 |

FOREIGN PATENT DOCUMENTS

| CN | 106167023 B | 10/2020 |
| KR | 101776721 B1 | 9/2017 |

* cited by examiner

*Primary Examiner* — Hitesh Patel
*Assistant Examiner* — Wenyuan Yang
(74) *Attorney, Agent, or Firm* — McCoy Russell LLP (57) ABSTRACT

Methods and systems for shifting a transmission of an electric vehicle are described. The methods and systems may be applied to fully electric or hybrid vehicles. The methods and systems may allow a transmission to be shifted within an acceptable time frame without supplying excess charge to an electric energy storage device.

8 Claims, 4 Drawing Sheets

CHARGE CURRENT BASED SHIFT METHOD AND SYSTEM

TECHNICAL FIELD

The present disclosure relates to a method and system for shifting a transmission of a vehicle that includes an electric powered propulsion source.

BACKGROUND AND SUMMARY

An electric vehicle may include a step ratio multi-speed transmission that directs power from an electric machine to vehicle wheels. The step ratio multi-speed transmission may be shifted in response to driver demand torque/power and vehicle speed. If the transmission is upshifted from a lower gear (e.g., first gear) to a higher gear (e.g., second gear), the speed of the electric machine may be reduced to match the speed of the higher gear before a clutch is closed to engage the higher gear. The speed of the electric machine may be reduced to the synchronous speed (e.g., speed of the higher gear) so that wear on the clutch may be reduced and vehicle drivability may be improved. However, the electric machine speed may be reduced slowly during an upshift, thereby lengthening the shift duration. Longer gear shift durations may be noticeable to vehicle occupants and they may be objectionable.

The inventors herein have recognized the above-mentioned issues and have developed a method for operating a vehicle, comprising: establishing an acceptable time duration for a gear shift of a transmission; and shifting a transmission gear in response to a battery energy level threshold, wherein the battery energy level threshold is based on the acceptable time duration for shifting the transmission gear.

By shifting a transmission in response to a battery energy threshold that is based on an acceptable duration for synchronizing an electric machine rotational speed with a transmission gear rotational speed, it may be possible to provide the technical result of shifting a transmission when a battery has capacity to store charge that is due to charge generated during slowing of an electric machine to improve the gear shift. In particular, the acceptable time duration may be applied to determine an amount of power that an electric energy storage device may receive during an upshift to slow an electric machine when the electric machine enters a regeneration mode where it operates as a generator to slow rotation of the electric machine's rotor.

The present description may provide several advantages. In particular, the approach may reduce a possibility of electric energy storage device degradation. In addition, the approach may improve gear shifting by ensuring gear shifting smoothness. Further, the approach provides a way to confirm that shift timing may be met before a shift is initiated so that shifting consistency may be maintained.

It is to be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not restricted to implementations that solve any disadvantages noted above or in any part of this disclosure.

DETAILED DESCRIPTION

Figure 1:
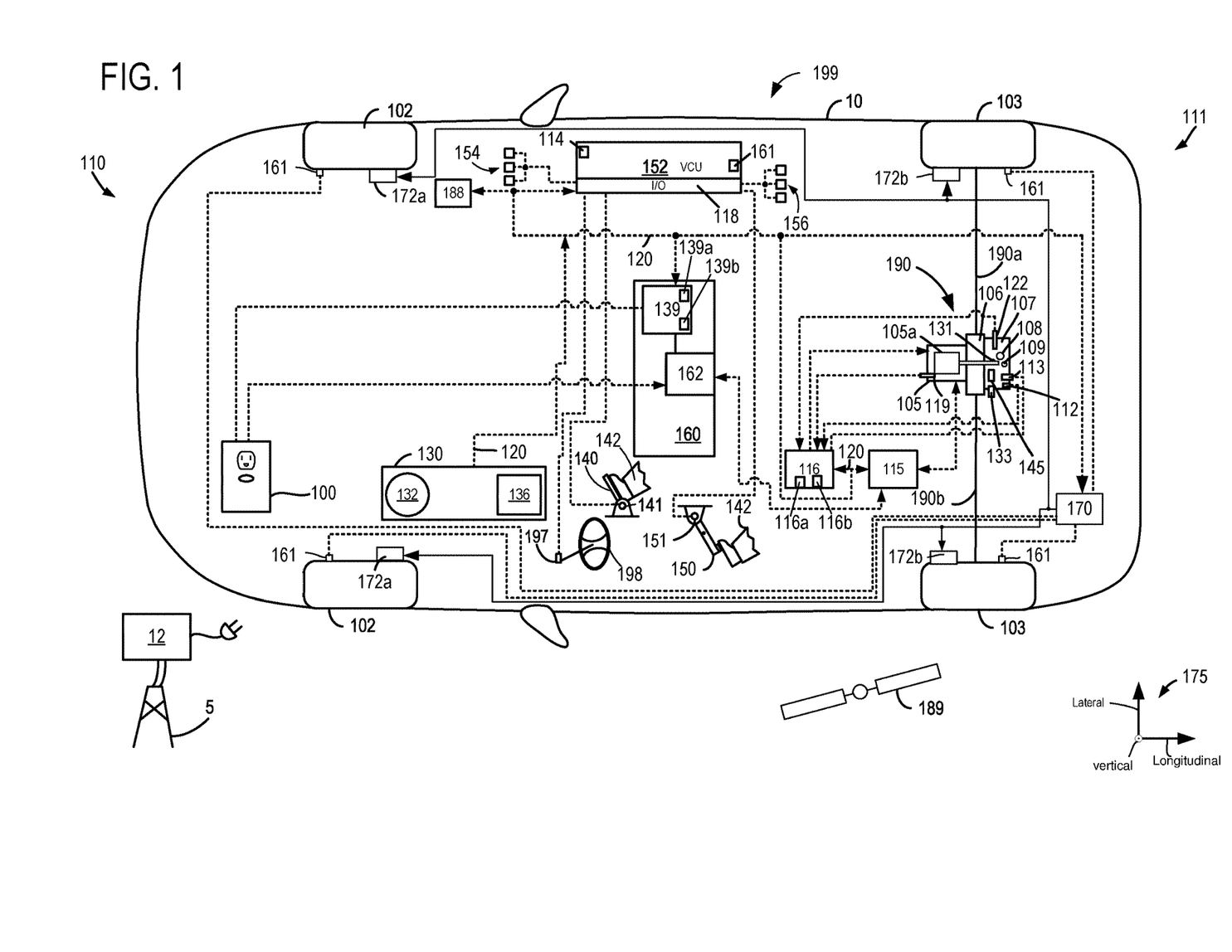
FIG. 1 is an illustration of an example vehicle that includes an electric energy storage system.
Figure 2:
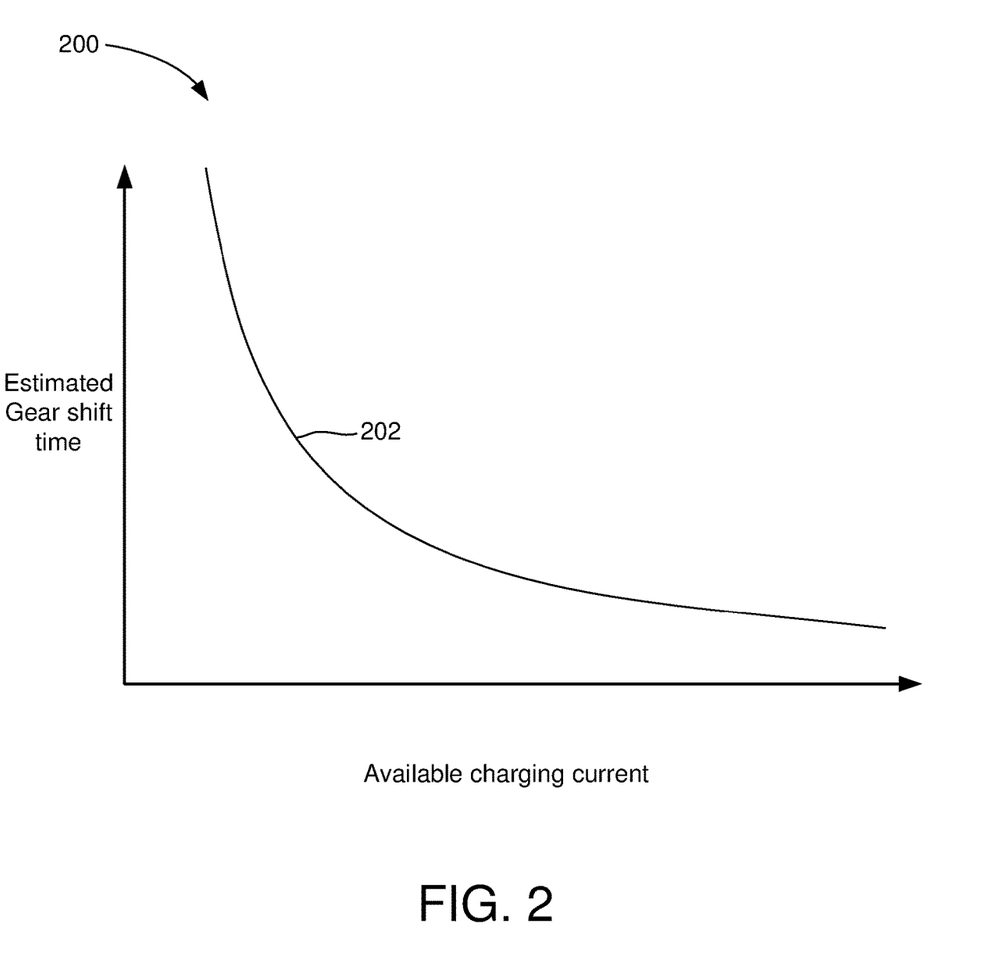
FIG. 2 shows a plot of estimated gear shifting time versus an available battery charging current.
Figure 3:
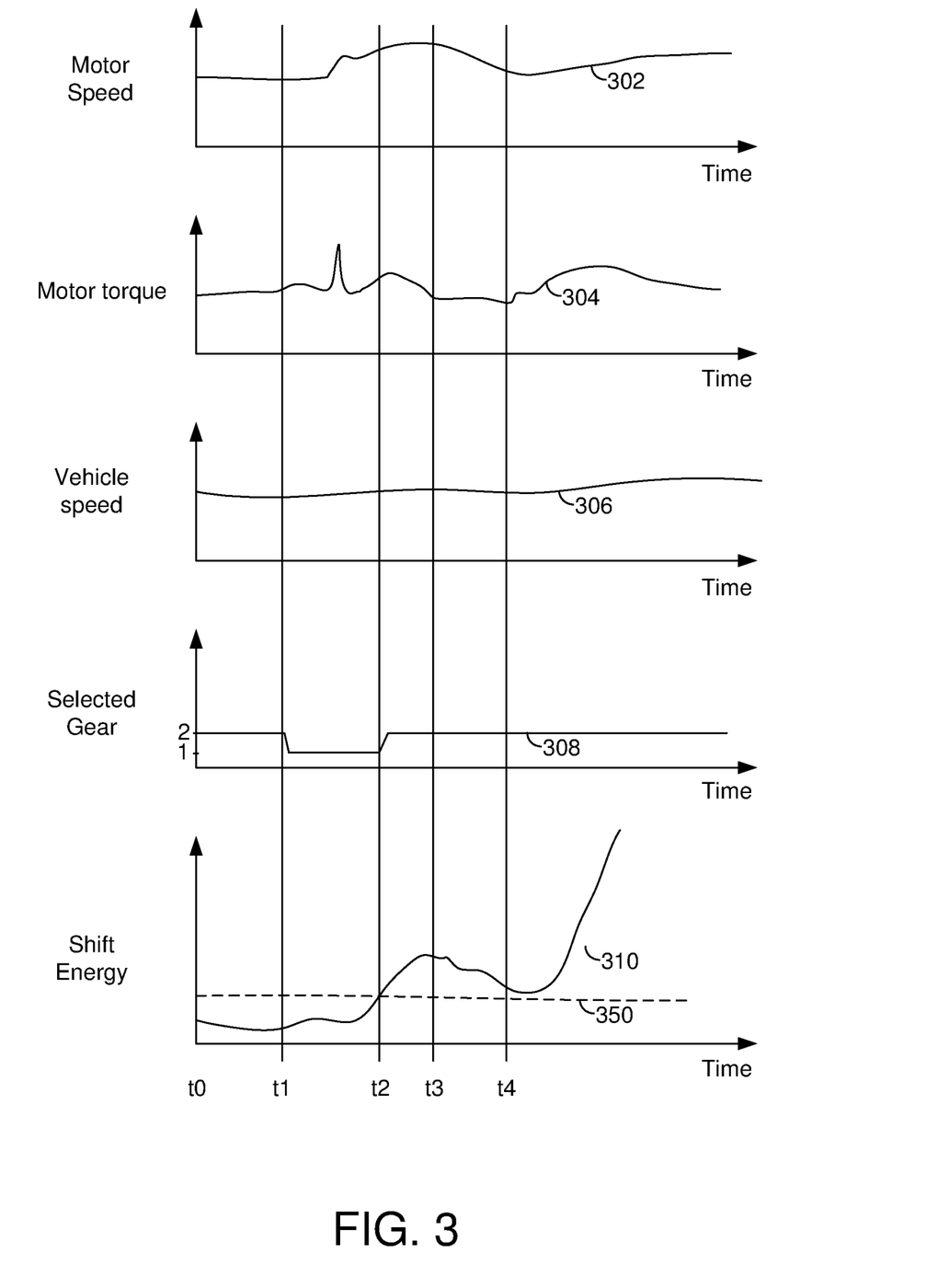
FIG. 3 shows an example vehicle operating sequence according to the method of FIG. 4.
Figure 4:
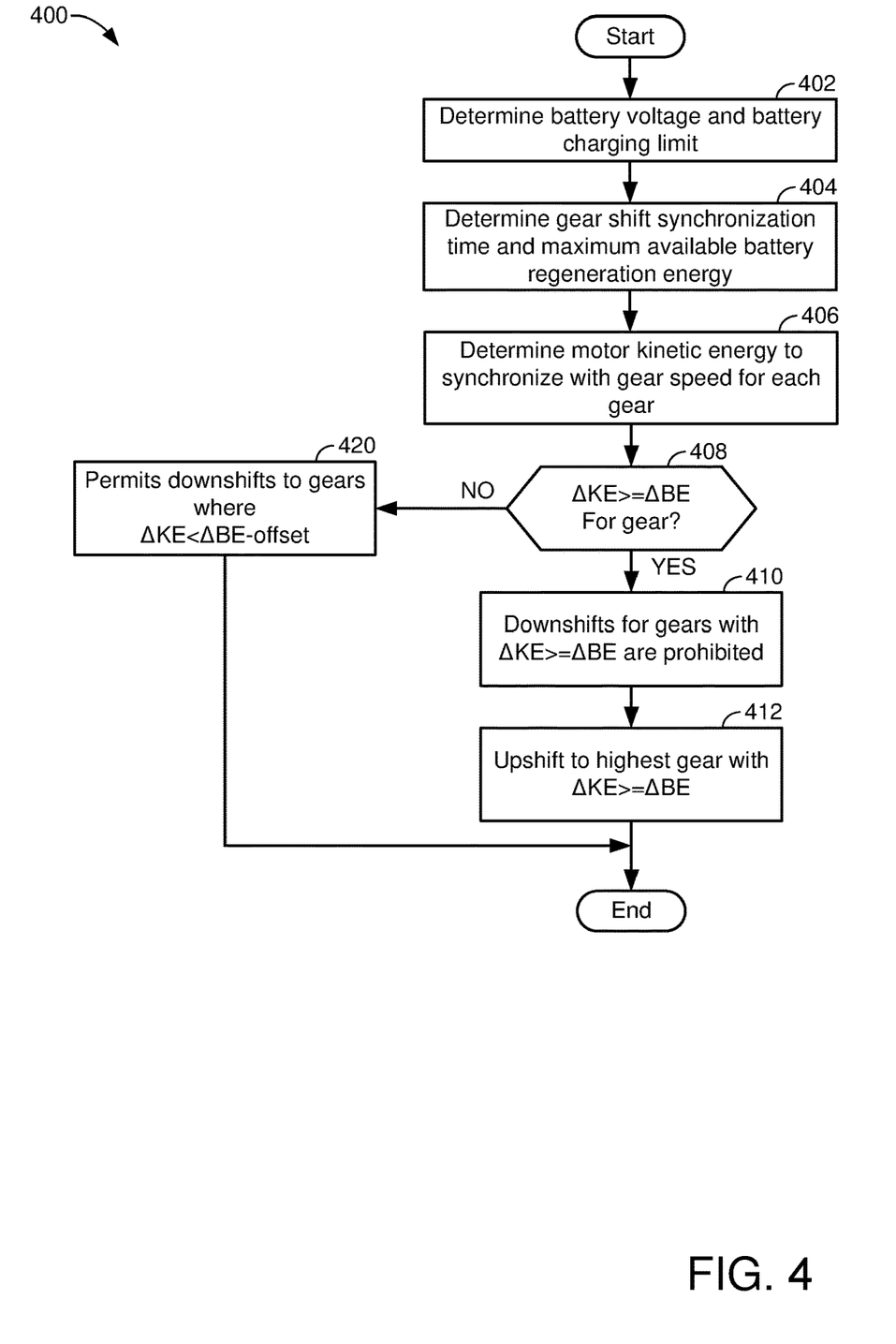
FIG. 4 shows an example method for operating a vehicle.

A method and system for operating a vehicle that includes a battery pack and an electric machine that is configured to propel the vehicle is described. The method and system are suitable for electric and hybrid vehicles. In one example, the method and system initiate a gear upshift in response to an energy level of an electric machine being greater than or equal to an amount of available energy that an electric energy storage device may be prepared to store. FIG. 1 shows a schematic view of an example vehicle. FIG. 2 shows a plot that relates an amount of time for synchronizing an electric machine rotational speed with a transmission gear rotational speed to available charging current for an electric energy storage device. An example vehicle operating sequence is shown in FIG. 3. Finally, FIG. 4 shows an example method for operating a vehicle that includes an electric machine that is coupled to a step ratio transmission.

FIG. 1 illustrates an example vehicle propulsion system 199 for vehicle 10. A front end 110 of vehicle 10 is indicated and a rear end 111 of vehicle 10 is also indicated. Vehicle 10 travels in a forward direction when front end leads movement of vehicle 10. Vehicle 10 travels in a reverse direction when rear end leads movement of vehicle 10. Vehicle propulsion system 199 includes a propulsion source 105 (e.g., an electric machine, such as a motor), but in other examples two or more propulsion sources may be provided. In one example, propulsion source 105 may be an electric machine that operates as a motor or generator. The propulsion source 105 is fastened to the electrified axle 190 and it delivers power from its rotor 105*a* to gear set 107. In FIG. 1 mechanical connections between the various components are illustrated as solid lines, whereas electrical connections between various components are illustrated as dashed lines.

Vehicle propulsion system 199 includes an electrified axle 190 (e.g., an axle that includes an integrated electric machine that provides propulsive effort for the vehicle). Electrified axle 190 may include two half shafts, including a first or right haft shaft 190*a* and a second or left half shaft 190*b*. Vehicle 10 further includes front wheels 102 and rear wheels 103.

The electrified axle 190 may be an integrated axle that includes differential gears 106, gear set 107, and propulsion source 105. Gear set 107 may be referred to as a step ratio transmission and it may include a plurality of gears and one or more clutches to shift between gears. In one example, the gear set may include a first gear 108, a second gear 109, and a third gear 131. Further, the electrified axle 190 may include one or more clutch actuators 112 to shift one or more clutches 145. Electrified axle 190 may include a first speed sensor 119 for sensing a speed of propulsion source 105 and a second speed sensor 122 for sensing a speed of an output shaft (not shown). Electric power inverter 115 is electrically coupled to propulsion source 105. An axle control unit 116 is electrically coupled to sensors and actuators of electrified axle 190.

Propulsion source 105 may transfer mechanical power to or receive mechanical power from gear set 107. As such, gear set 107 may be a multi-speed gear set that may shift between gears (e.g., first gear 108 and second gear 109) when commanded via axle control unit 116. Axle control unit 116 includes a processor 116a and memory 116b. Memory 116b may include read only memory, random access memory, and keep alive memory. Axle control unit 116 may receive transmission temperature via sensor 133. Gear set 107 may transfer mechanical power to or receive mechanical power from differential gears 106. Differential gears 106 may transfer mechanical power to or receive mechanical power from rear wheels 103 via right half shaft 190a and left half shaft 190b. Propulsion source 105 may consume alternating current (AC) electrical power provided via electric power inverter 115. Alternatively, propulsion source 105 may provide AC electrical power to electric power inverter 115. Electric power inverter 115 may be provided with high voltage direct current (DC) power from battery 160 (e.g., a traction battery, which also may be referred to as an electric energy storage device or battery pack). Electric power inverter 115 may convert the DC electrical power from battery 160 into AC electrical power for propulsion source 105. Alternatively, electric power inverter 115 may be provided with AC power from propulsion source 105. Electric power inverter 115 may convert the AC electrical power from propulsion source 105 into DC power to store in battery 160.

Battery 160 may periodically receive electrical energy from a power source such as a stationary power grid 5 residing external to the vehicle (e.g., not part of the vehicle). As a non-restricted example, vehicle propulsion system 199 may be configured as a plug-in electric vehicle (EV), whereby electrical energy may be supplied to battery 160 via the power grid 5 and charging station 12. Electric charge may be delivered to battery 160 via plug receptacle 100.

Battery 160 may include a BMS controller 139 (e.g., a battery management system controller) and an electrical power distribution box 162. BMS controller 139 may provide charge balancing between energy storage elements (e.g., battery cells) and communication with other vehicle controllers (e.g., vehicle control unit 152). BMS controller 139 includes a core processor 139a and memory 139b (e.g., random-access memory, read-only memory, and keep-alive memory).

Vehicle 10 may include a vehicle control unit (VCU) 152 that may communicate with electric power inverter 115, axle control unit 116, friction or foundation brake controller 170, global positioning system (GPS) 188, BMS controller 139, and dashboard 130 and components included therein via controller area network (CAN) 120. VCU 152 includes memory 114, which may include read-only memory (ROM or non-transitory memory) and random access memory (RAM). VCU also includes a digital processor or central processing unit (CPU) 161, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156. Sensors 154 may include but are not restricted to lateral accelerometers, longitudinal accelerometers, yaw rate sensors, inclinometers, temperature sensors, battery voltage and current sensors, and other sensors described herein. Additionally, sensors 154 may include steering angle sensor 197, driver demand pedal position sensor 141, vehicle range finding sensors including radio detection and ranging (RADAR), light detection and ranging (LIDAR), sound navigation and ranging (SONAR), and brake pedal position sensor 151. Actuators may include but are not constrained to inverters, transmission controllers, display devices, human/machine interfaces, friction braking systems, and battery controller described herein.

Driver demand pedal position sensor 141 is shown coupled to driver demand pedal 140 for determining a degree of application of driver demand pedal 140 by human 142. Brake pedal position sensor 151 is shown coupled to brake pedal 150 for determining a degree of application of brake pedal 150 by human 142. Steering angle sensor 197 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system 199 may also include a dashboard 130 that an operator of the vehicle may interact with. Dashboard 130 may include a display system 132 configured to display information to the vehicle operator. Display system 132 may comprise, as a non-restricting example, a touchscreen, or human machine interface (HMI), display which enables the vehicle operator to view graphical information as well as input commands. In some examples, display system 132 may be connected wirelessly to the internet (not shown) via VCU 152. As such, in some examples, the vehicle operator may communicate via display system 132 with an internet site or software application (app) and VCU 152.

Dashboard 130 may further include an operator interface 136 via which the vehicle operator may adjust the operating status of the vehicle. Specifically, the operator interface 136 may be configured to activate and/or deactivate operation of the vehicle driveline (e.g., propulsion source 105) based on an operator input. Further, an operator may request an axle mode (e.g., park, reverse, neutral, drive) via the operator interface. Various examples of the operator interface 136 may include interfaces that utilize a physical apparatus, such as a key, that may be inserted into the operator interface 136 to activate the electrified axle 190 and propulsion source 105 and to turn on the vehicle 10 or may be removed to shut down the electrified axle and propulsion source 105 to turn off vehicle 10. Electrified axle 190 and propulsion source 105 may be activated via supplying electric power to propulsion source 105 and/or electric power inverter 115. Electrified axle 190 and electric machine may be deactivated by ceasing to supply electric power to electrified axle 190 and propulsion source 105 and/or electric power inverter 115. Still other examples may additionally or optionally use a start/stop button that is manually pressed by the operator to start or shut down the electrified axle 190 and propulsion source 105 to turn the vehicle on or off. In other examples, a remote electrified axle or electric machine start may be initiated remote computing device (not shown), for example a cellular telephone, or smartphone-based system where a user's cellular telephone sends data to a server and the server communicates with the vehicle control unit 152 to activate the electrified axle 190 including an inverter and electric machine. Spatial orientation of vehicle 10 is indicated via axes 175.

Vehicle 10 is also shown with a foundation or friction brake controller 170. Friction brake controller 170 may selectively apply and release friction brakes (e.g., 172a and 172b) via allowing hydraulic fluid to flow to the friction brakes. The friction brakes may be applied and released so as to avoid locking of the friction brakes to front wheels 102 and rear wheels 103. Wheel position or speed sensors 161 may provide wheel speed data to friction brake controller 170. Vehicle propulsion system 199 may provide torque to rear wheels 103 to propel vehicle 10.

A human or autonomous driver may request a driver demand wheel torque, or alternatively a driver demand wheel power, via applying driver demand pedal 140 or via supplying a driver demand wheel torque/power request to vehicle control unit 152. Vehicle control unit 152 may then demand a torque or power from propulsion source 105 via commanding axle control unit 116. Axle control unit 116 may command electric power inverter 115 to deliver the driver demand wheel torque/power via electrified axle 190 and propulsion source 105. Electric power inverter 115 may convert DC electrical power from battery 160 into AC power and supply the AC power to propulsion source 105. Propulsion source 105 rotates and transfers torque/power to gear set 107. Gear set 107 may supply torque from propulsion source 105 to differential gears 106, and differential gears 106 transfer torque from propulsion source 105 to rear wheels 103 via half shafts 190a and 190b.

During conditions when the driver demand pedal is fully released, vehicle control unit 152 may request a small negative or regenerative braking power to gradually slow vehicle 10 when a speed of vehicle 10 is greater than a threshold speed. The amount of regenerative braking power requested may be a function of driver demand pedal position, battery state of charge (SOC), vehicle speed, and other conditions. If the driver demand pedal 140 is fully released and vehicle speed is less than a threshold speed, vehicle control unit 152 may request a small amount of positive torque/power (e.g., propulsion torque) from propulsion source 105, which may be referred to as creep torque or power. The creep torque or power may allow vehicle 10 to remain stationary when vehicle 10 is on a positive grade.

The human or autonomous driver may also request a negative or regenerative driver demand braking torque, or alternatively a driver demand braking power, via applying brake pedal 150 or via supplying a driver demand braking power request to vehicle control unit 152. Vehicle control unit 152 may request that a first portion of the driver demanded braking power be generated via electrified axle 190 and propulsion source 105 via commanding axle control unit 116. Additionally, vehicle control unit 152 may request that a portion of the driver demanded braking power be provided via friction brakes 172 via commanding friction brake controller 170 to provide a second portion of the driver requested braking power.

After vehicle control unit 152 determines the braking power request, vehicle control unit 152 may command axle control unit 116 to deliver the portion of the driver demand braking power allocated to electrified axle 190. Electric power inverter 115 may convert AC electrical power generated by propulsion source 105 into DC power for storage in battery 160. Propulsion source 105 may convert the vehicle's kinetic energy into AC power.

Axle control unit 116 includes predetermined transmission gear shift schedules whereby fixed ratio gears of gear set 107 may be selectively engaged and disengaged. Shift schedules stored in axle control unit 116 may select gear shift points or conditions as a function of driver demand wheel torque and vehicle speed.

Thus, the system of FIG. 1 provides for a vehicle system, comprising: an electric machine configured to propel a vehicle; a step ratio transmission coupled to the electric machine; an electric energy storage device; an inverter electrically coupled to the electric machine; a first controller coupled to the electric machine; a second controller in communication with the first controller, the second controller including executable instructions that cause the second controller to upshift the step ratio transmission from a first gear to a second gear in response to an available electric energy storage device energy being less than or equal to a kinetic energy of the electric machine. In a first example, further comprising additional executable instructions that cause the second controller to determine the kinetic energy of the electric machine based on a present speed of the electric machine and a requested speed of the electric machine. In a second example that may include the first example, the vehicle system further comprises additional executable instructions that cause the second controller to determine the available electric energy storage device energy based on an electric energy storage device voltage, a shift synchronization time not to exceed threshold, and an electric energy storage device charging current not to exceed threshold. In a third example that may include one or both of the first and second examples, the vehicle system includes where the first controller communicates a voltage and the electric energy storage device charging not to exceed threshold to the second controller. In a fourth example that may include one or more of the first through third examples, the vehicle system includes wherein the shift synchronization time not to exceed threshold is a function of a transmission temperature. In a fifth example that may include one or more of the first through fourth examples, the vehicle system further comprises additional executable instructions to reducing a speed of the electric machine wherein the upshifting the transmission. In a sixth example that may include one or more of the first through fifth examples, the vehicle system includes wherein the speed of the electric machine is reduced to a speed of the second gear.

Turning now to FIG. 2, a plot illustrating a relationship between transmission gear shift synchronization time (e.g., an amount of time from a start of a gear shift for motor rotational speed to reach a rotational speed of a gear to be engaged) and available battery charging current (e.g., an amount of electric current that a battery may receive to charge the battery) is shown. The start of the gear shift may begin when release of a clutch to disengage a presently engaged gear begins. The vertical axis represents an estimated gear shift synchronization time and the estimated gear shift synchronization time increases in the direction of the vertical axis arrow. The horizontal axis represents available charging current (e.g., a maximum amount of current that may be received by a battery) and the available charging current increases in the direction of the horizontal axis arrow.

Solid line 202 shows the relationship between the estimated gear shift synchronization time and the available charging current. It may be observed that the estimated gear shift synchronization time increases as the available amount of charging current decreases. Said another way, the estimated shift synchronization time decreases as the available amount of charging current increases. This relationship holds because greater amounts of electrical energy, up to a point, may be generated by increasing the rate that the speed of the electric machine is reduced when the electric machine rotational speed is being reduced to the rotational speed of the gear that is being engaged.

Referring now to FIG. 3, an example vehicle operating sequence according to the method of FIG. 4 is shown. The sequence of FIG. 3 may be provided via the system of FIG. 1 in cooperation with the method of FIG. 4.

The first plot from the top of FIG. 4 is a plot of motor speed versus time. The vertical axis represents the motor speed and the motor speed increases in the direction of the vertical axis arrow. The horizontal axis represents time and time increases from the left side of the plot to the right side of the plot. Trace 302 represents the motor speed.

The second plot from the top of FIG. 4 is a plot of motor torque versus time. The vertical axis represents the motor torque and the motor torque increases in the direction of the vertical axis arrow. The horizontal axis represents time and time increases from the left side of the plot to the right side of the plot. Trace 304 represents the motor torque.

The third plot from the top of FIG. 4 is a plot of vehicle speed versus time. The vertical axis represents the vehicle speed and the vehicle speed increases in the direction of the vertical axis arrow. The horizontal axis represents time and time increases from the left side of the plot to the right side of the plot. Trace 306 represents the vehicle speed.

The fourth plot from the top of FIG. 4 is a plot of selected transmission gear versus time. The vertical axis represents the selected transmission gear and the selected transmission gears are indicated along the vertical axis. The horizontal axis represents time and time increases from the left side of the plot to the right side of the plot. Trace 308 represents the selected transmission gear.

The fifth plot from the top of FIG. 4 is a plot of gear shift energy demand or the kinetic energy needed to lower motor speed to accommodate a gear shift versus time. The vertical axis represents gear shift energy demand and the gear shift energy demand increases in the direction of the vertical axis arrow. The horizontal axis represents time and time increases from the left side of the plot to the right side of the plot. Trace 310 represents the gear shift energy demand. Horizontal line 350 represents a maximum available battery regeneration energy (e.g., a maximum amount of energy that may be input to the battery when the electric machine is operating in a regeneration mode as a generator).

At time t0, the motor speed and torque are steady. The vehicle speed is decreasing and the selected gear is second gear. The gear shift energy is less than threshold 350.

At time t1, the motor speed and motor torque are low. The vehicle speed has decreased and the transmission is downshifted from second gear to first gear. The low shift energy level allows the downshift to occur. First gear is the selected transmission gear shortly after time t1.

Between time t1 and time t2, the motor torque is increased and the motor speed begins to increase. The vehicle speed also begins to increase and the selected gear remains first gear. The gear shift energy remains low so that the transmission gear is not shifted.

At time t2, the motor speed has increased and the motor torque is increased. The selected gear changes from first gear to second gear in response to the shift energy level being equal to or exceeding threshold 350.

Between time t3 and time t4, the motor speed is reduced and the motor torque is reduced. The vehicle speed is slightly lower and the selected gear remains second gear. The motor speed is reduced to a speed that is synchronous with the second gear speed so that the second gear may be engaged smoothly. The shift energy is reduced between time t3 and time t4, but it remains above threshold 350.

In this way, a gear may be engaged and torque of a motor may be controlled so that motor speed is reduced to a speed of the gear that is to be engaged during an upshift. By upshifting the transmission in response to motor kinetic energy exceeding a maximum battery regenerative energy, it may be determined that a battery may store energy that is generated to reduce motor speed to a speed that is synchronous with a speed of a gear that is to be engaged.

Referring now to FIG. 4, a flow chart of a method for operating vehicle that includes an electric machine and a transmission is shown. The method of FIG. 4 may be applied to the system of FIG. 1. One or more controllers may perform at least a portion of method 400 via changing operating states of one or more actuators.

At 402, method 400 determines a voltage of a traction battery ($V_{batt}$) and a traction battery charging energy not to exceed threshold ($I_{cl}$). The voltage of the traction battery may be input directly to the controller and the traction battery charging not to exceed threshold may be determined as a function of traction battery temperature, state of charge (SOC), etc. Method 400 proceeds to 404.

At 404, method 400 determines a gear shift synchronization time ($t_{sst}$) and a maximum available battery regeneration energy ($\Delta BE$). In one example, the gear shift synchronization time may be a function of a transmission temperature and other factors, such as but not restricted to vehicle drive mode (e.g., sport, touring, etc.), driver demand torque or power, etc. The gear shift synchronization time may be looked up from a table of empirically determined values that may be generated via driving a vehicle and modifying gear shift synchronization times to generate smooth and quick shifts.

The available battery regeneration energy (e.g., an amount of energy a battery may receive from an electric machine during a gear shift) may be determined via the following equation:

$$\Delta BE = I_{cl} \cdot V_{batt} \cdot t_{ssl}$$

where the variables are as previously described. Method 400 proceeds to 406.

At 406, method 400 determines motor kinetic energy to move the rotational speed of the electric machine that provides propulsion force to the vehicle to a rotational speed of a gear (e.g., the gear that is to be engaged), which may be referred to as a synchronous speed. The motor kinetic energy to move the rotational speed of the electric machine to the speed of the gear may be determined via the following equation:

$$\Delta KE = \frac{1}{2} \cdot J_{rot} \cdot (\omega_f^2 - \omega_i^2)$$

where $\Delta KE$ is the motor kinetic energy to move the rotational speed of the electric machine to a rotational speed of gear, $J_{rot}$ is the rotational inertia of the motor's rotor, $\omega_f^2$ is the present rotational speed of the motor, and $\omega_i^2$ is the requested or target synchronous rotational speed for the motor. Motor kinetic energy associated with each of the transmissions gears that are greater than first gear may be determined at step 406. Thus, if the transmission includes a second gear and a third gear, method 400 may determine kinetic energy to move the rotational speed of the motor to the rotational speed of the second gear during a first gear to second gear shift. Method 400 may also determine the kinetic energy to move the rotational speed of the motor to the rotational speed of the third gear during a second gear to third gear shift. The motor kinetic energy to move the rotational speed of the motor to the rotational speed of the second gear will be different than the motor kinetic energy to move the rotational speed of the motor to the rotational speed of the third gear since the second gear rotates at a different speed than the third gear. Method 400 proceeds to 408 after determining the kinetic energies.

At 408, method 400 judges whether or not the motor kinetic energy to move the rotational speed of the electric machine to one or more of the rotational speeds of gears in the transmissions is greater than or equal to the maximum available battery regeneration energy, which may be expressed as $\Delta KE \geq \Delta BE$. If method 400 judges that the motor kinetic energy to move the rotational speed of the electric machine to one or more of the rotational speeds of gears in the transmissions is greater than or equal to the maximum available battery regeneration energy, the answer is yes and method 400 proceeds to 410. Otherwise, the answer is no and method 400 proceeds to 420.

Note that method 400 evaluates this condition for each gear that is greater than first gear. For example, method 400 judges if $\Delta KE_2 \geq \Delta BE$ for first to second gear upshifts where $\Delta KE_2$ is the amount of kinetic energy to move the motor to the rotational speed of the second gear. Method 400 may also judge if $\Delta KE_3 \geq \Delta BE$ for second to third gear upshifts where $\Delta KE_3$ is the amount of kinetic energy to move the motor to the speed of the third gear.

At 410, method 400 prohibits downshifts for gears where the motor kinetic energy for the downshift is greater than or equal to the maximum available battery regeneration energy minus an offset, which may be expressed as $\Delta KE \geq (\Delta BE - \text{offset})$. The offset is an amount of energy and it is applied to reduce a possibility of frequent gear shifting. Method 400 proceeds to 412.

At 412, method 400 upshifts to the highest gear for which the motor kinetic energy is greater than the maximum available battery regeneration energy for gear speed synchronization. For example, if $\Delta BE=20$ kilo-Joules (KJ), $\Delta KE_2=25$ kJ, and $\Delta KE_3=20$ kJ, the transmission is upshifted to third gear if the transmission was in second gear. Alternatively, if $\Delta BE=20$ kJ, $\Delta KE_2=20$ kJ, and $\Delta KE_3=15$ kJ, the transmission is upshifted to second gear if the transmission was in first gear. During an upshift, the motor speed may be reduced such that the motor is entered into a regeneration mode where the motor operates as a generator and slows to a speed of the gear that is about to be engaged or is pending engagement. In some transmission configurations, one clutch may be opened and a second clutch may be closed during the upshift. In other examples, a single clutch may be opened and then closed to engage the next gear. Method 400 proceeds to exit.

At 420, method 400 permits downshifts to gears for which the motor kinetic energy is less than the maximum available battery regeneration energy for gear speed synchronization minus an offset energy. For example, if $\Delta BE-\text{offset}=19.5$ kJ, $\Delta KE_2=25$ kJ, and $\Delta KE_3=19.4$ kJ, the transmission is downshifted from third gear to second gear if the transmission was in third gear. Alternatively, if $\Delta BE-\text{offset}=19.5$ kJ, $\Delta KE_2=19.4$ kJ, and $\Delta KE_3=13$ kJ, the transmission is downshifted to first gear if the transmission was in second gear. During a downshift, the motor speed may be increased so that motor speed matches speed of the lower gear that is to be engaged. In some transmission configurations, one clutch may be opened and a second clutch may be closed during the downshift. In other examples, a single clutch may be opened and then closed to engage the next gear. Method 400 proceeds to exit.

In this way, a transmission may be shifted from a first gear to a second gear in response to motor kinetic regeneration energy and maximum available battery regeneration energy. The present transmission shifting strategy may help to ensure that motor rotational speed may be synchronized with rotational speed of a gear so that gear shifting may be smooth and clutch wear may be reduced.

The method of FIG. 4 provides for a method for operating a vehicle, comprising: establishing an acceptable time duration for synchronizing an electric machine rotational speed with a transmission gear rotational speed; and shifting a transmission gear in response to a battery energy level threshold, wherein the battery energy threshold is based on the acceptable time duration for synchronizing an electric machine rotational speed with a transmission gear rotational speed. In a first example, the method includes where the acceptable time duration for synchronizing an electric machine rotational speed with a transmission gear rotational speed is a function of a transmission temperature. In a second example that may include the first example, the method further comprises upshifting the transmission in further response to an electric machine energy level exceeding the battery energy level threshold. In a third example that may include one or both of the first and second examples, the method includes wherein the battery energy level threshold is a regenerative battery energy level threshold. In a fourth example that may include one or more of the first through third examples, the method includes wherein the battery energy level threshold is further based on a battery voltage. In a fifth example that may include one or more of the first through fourth examples, the method includes wherein the battery energy level threshold is further based on a battery charging current not to exceed threshold. In a sixth example that may include one or more of the first through fifth examples, the method further comprises inhibiting downshifting to a gear in response an electric machine energy level exceeding the battery energy level threshold. In a seventh example that may include one or more of the first through sixth examples, the method includes wherein the electric machine energy level is based on a present electric machine speed and a requested electric machine speed.

The method of FIG. 4 also provides for a method for operating a vehicle, comprising: establishing an acceptable time duration for synchronizing an electric machine rotational speed with a transmission gear rotational speed; and shifting to a transmission gear in response to an electric machine energy level, wherein the electric machine energy level is based on a present electric machine speed and a requested electric machine speed. In a first example, the method includes wherein the transmission gear is shifted in response to the electric machine energy level being greater than or equal to a battery energy level threshold. In a second example that may include the first example, the method includes where the battery energy level threshold is based on the acceptable time duration for synchronizing the electric machine rotational speed with the transmission gear rotational speed. In a third example that may include one or both of the first and second examples, the method includes where the acceptable time duration for synchronizing the electric machine rotational speed with a transmission gear rotational speed is based on the transmission temperature. In a fourth example that may include one or more of the first through third examples, the method further comprises reducing a speed of an electric machine during the shifting.

In another representation, the method of FIG. 4 provides for a method for operating a vehicle, comprising: shifting a transmission from a first gear to a second gear in response to a motor kinetic energy level for reducing a rotational speed of a motor from a first speed to a second speed being greater than or equal to a maximum battery regenerative energy, where the maximum battery regenerative energy is based on a predetermined amount of time to reduce the rotational speed of the motor from the first speed to the second speed. In a first example, the method includes where the maximum battery energy is further based on a maximum battery charging current. In a second example that may include the first example, the method includes reducing a rotational speed of an electric machine during shifting of the transmission.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. Thus, the described actions, operations and/or functions may graphically represent code to be programmed into non-transitory memory of the computer readable storage medium in the vehicle and/or transmission control system. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it is to be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
   establishing an acceptable time duration for synchronizing an electric machine rotational speed with a transmission gear rotational speed; and
   shifting from a first transmission gear to a second transmission gear in response to a battery energy level threshold, wherein the battery energy level threshold is based on the acceptable time duration for synchronizing the electric machine rotational speed with the transmission gear rotational speed.

2. The method of claim 1, where the acceptable time duration for synchronizing the electric machine rotational speed with the transmission gear rotational speed is a function of a transmission temperature.

3. The method of claim 1, further comprising upshifting a transmission in further response to an electric machine energy level exceeding the battery energy level threshold.

4. The method of claim 3, wherein the battery energy level threshold is a regenerative battery energy level threshold.

5. The method of claim 1, wherein the battery energy level threshold is further based on a battery voltage.

6. The method of claim 5, wherein the battery energy level threshold is further based on a battery charging current not to exceed threshold.

7. The method of claim 1, further comprising inhibiting downshifting to a gear in response an electric machine energy level exceeding the battery energy level threshold.

8. The method of claim 7, wherein the electric machine energy level is based on a present electric machine speed and a requested electric machine speed.

* * * * *